June 12, 1928.   C. M. SMITH   1,673,759
TOY ANIMAL FIGURE
Filed May 29, 1926
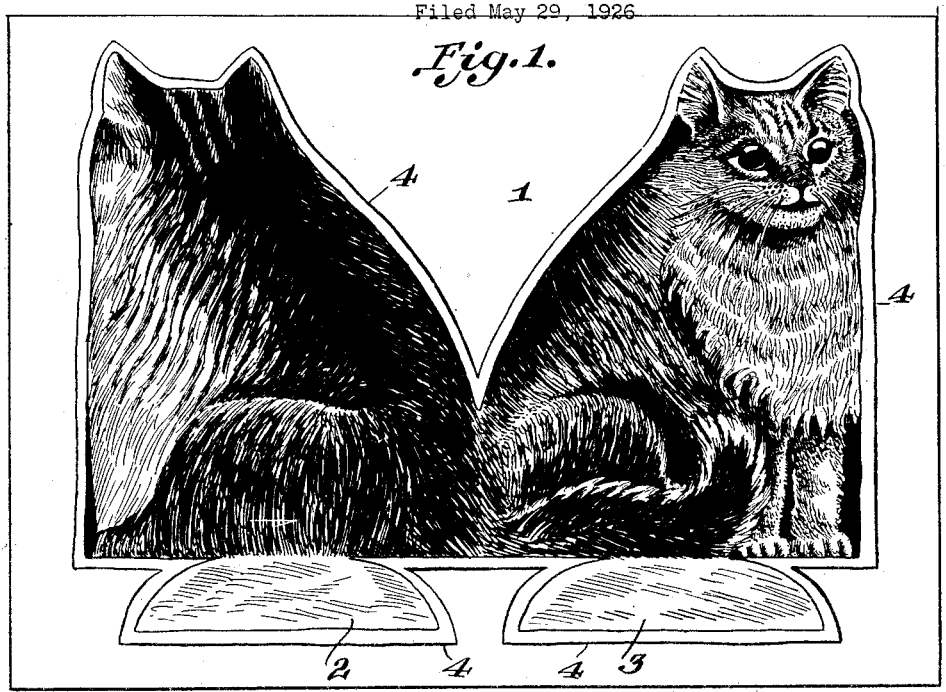
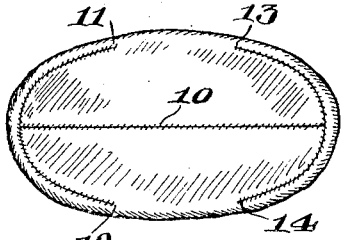
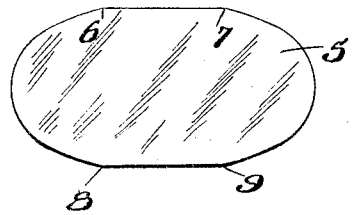
Inventor
Celia M. Smith Patented June 12, 1928.

1,673,759

UNITED STATES PATENT OFFICE.

CELIA M. SMITH, OF ITHACA, NEW YORK.

TOY ANIMAL FIGURE.

Application filed May 29, 1926. Serial No. 112,566.

This invention relates to a toy animal figure and the method of forming the same.

An object of the invention is to provide a toy animal which is easily and inexpensively made and which will have even seams and surface with no folds or puckers. Other objects and advantages will hereinafter appear.

An embodiment of the invention is illustrated in the accompanying drawing wherein Figure 1 shows a plan view of a design of an animal figure before the same is turned and joined.

Figure 2 shows the completed figure.

Figure 3 is a bottom plan view of the figure, and

Figure 4 shows in detail the cardboard used as part of the base of the figure.

In the embodiment shown the figure is depicted as that of a cat, but of course it is understood that the figure may be that of any other animals, equally as well.

A flat piece of cloth or other material, 1, is provided on the surface thereof with a painting, print or stamping showing the figure of the animal desired. Ordinarily this painting, print, or stamping will comprise a front and rear view of the animal so that when the two views are joined together, the completed animal will result.

Projecting from the bottom of the figure respectively, are semi-oval portions 2 and 3. The purpose of these portions will be more fully explained hereinafter.

The painted, printed, or stamped figure is cut from the cloth on the line 4 as shown in Figure 1, so that a margin of the material is left. After the figure has been cut from the cloth, the front and rear views of the animal are turned and sewed together all along the margin thus provided except at the base where the semi-oval portions 2 and 3 meet.

The figure will then be stuffed with cotton or other material.

A substantially oval piece of cardboard or other material, 5, is then inserted in the base of the figure next to the stuffing thereof so as to form a level and firm base. It should be observed that the cardboard oval, 5, is provided with substantially straight sides between the points 6 and 7, and 8 and 9. After the cardboard oval has been inserted in the base of the animal, the semi-oval flaps 2 and 3, which are integral with the figure, are then bent up so that their straight sides lie adjacent one another.

These semi-oval members may then be stitched together at the meeting edge of their straight sides so as to form a seam, 10. They are also stitched to the main body of the figure between the points 11 and 12, and 13 and 14. Those parts of the oval lying between points 11 and 13, and 12 and 14, comprise the portions that are integrally formed with the main part of the figure and therefore stitching at such points is not required.

It should also be observed that the points just mentioned correspond to the straight sides of the cardboard base 5. This arrangement enables the base of the figure to be readily formed and prevents wrinkling or puckering thereof.

Having described the specific embodiment of the invention, the following claim is appended hereto with the understanding that the invention is susceptible to many variations and modifications within the scope of said claim.

What I claim is:

A toy animal figure comprising a single piece of material formed to simulate the front, rear and base portions of the animal, the front and rear portions being folded together in such a manner that a suitable filler may be inserted therebetween, the base portion being formed of two semi-oval shaped elements of the single piece, means for stiffening the base portion and forming a smooth base surface for the animal consisting of a flat stiffening element, the stiffening means having substantially straight side sections and rounded ends, the semi-oval flaps being adapted to fit over the stiffening means, having their straight sides lying adjacent to one another and forming a seam, the ends of the semi-oval shaped elements being adapted to be stitched to the main body portion of the toy animal figure for only a portion of its periphery.

In testimony whereof I affix my signature.

CELIA M. SMITH.